United States Patent [19]

Oonishi et al.

[11] Patent Number: 5,155,796

[45] Date of Patent: Oct. 13, 1992

[54] PLASTIC OPTICAL FIBERS

[75] Inventors: Hiroaki Oonishi; Katsuhiko Shimada; Takashi Yamamoto, all of Otake, Japan

[73] Assignee: Mitsubishi Rayon Co., Ltd., Tokyo, Japan

[21] Appl. No.: 798,932

[22] Filed: Nov. 29, 1991

[30] Foreign Application Priority Data

Nov. 30, 1990 [JP] Japan ................................. 2-330069
Nov. 30, 1990 [JP] Japan ................................. 2-330071

[51] Int. Cl.$^5$ ............................................. G02B 6/16
[52] U.S. Cl. .................................... 385/143; 385/145; 525/199
[58] Field of Search ............... 385/141, 142, 143, 144, 385/145, 122, 123, 124, 125, 126; 526/247; 549/455; 525/199

[56] References Cited

U.S. PATENT DOCUMENTS 3,978,030  8/1976  Resnick ............................. 526/247
5,080,508  1/1992  Onishi et al. ...................... 385/143

FOREIGN PATENT DOCUMENTS 0340555  8/1989  Fed. Rep. of Germany.
0340557  8/1989  Fed. Rep. of Germany.

Primary Examiner—John D. Lee
Assistant Examiner—Phan T. Heartney
Attorney, Agent, or Firm—Finnegan, Henderson, Farabow, Garrett & Dunner

[57] ABSTRACT

A novel all-plastic optical fiber comprising core and clad components which is tough, flexible, and which has a low transmission loss, wherein the core component is composed of a homopolymer or copolymer of a monomer selected from one or more monomers represented by the general formula (I), or a copolymer of the at least one monomer represented by the general formula (I) and other copolymerizable comonomers and which has a glass transition temperature $Tg_1°$ C.; and wherein the clad component is composed of a copolymer of perfluoro[2,2-dimethyl-1,3-dioxol] and one other ethylenically unsaturated monomer, and which has a glass transition temperature $Tg_2°$ C.; and which meets the relationship wherein that the absolute difference of $|Tg_1 - Tg_2|$ is not greater than 30° C.

$$CY_2=\underset{\underset{O}{\|}}{\overset{X}{\underset{|}{C}}}-C-O-Rf \qquad (I)$$

(wherein X is $CH_3$, H, D, F, Cl, or $CF_3$; Y is H or D; and Rf is a fluoroalkyl group having a linear or branched chain).

7 Claims, 2 Drawing Sheets

PLASTIC OPTICAL FIBERS

BACKGROUND OF THE INVENTION

1. Field of the Invention

The present invention relates to a Plastic optical fiber. More specifically, the present invention relates to a plastic optical fiber which can be used as optical fiber codes and optical fiber cables.

2. Description of the Related Art

Inorganic glass optical fibers have been known as optical fibers which are excellent in light transmission properties over a broad range of wavelengths. However, since said glass optical fibers are not good in processability or flexural strength, plastic optical fibers were developed and have been widely used as optional fibers.

These plastic optical fibers are basically comprised of a core polymer comprising a polymer which has excellent light transmission properties and a high refractive index, such as polymethyl methacrylate (hereinafter referred to as PMMA), polycarbonate (hereinafter referred to as PC), and a clad polymer comprising a transparent polymer which has a refractive index lower than that of the core polymer, such as fluorine-containing polymers.

Known examples of the plastic optical fibers of this type are optical fiber strands, bulk fibers made by covering optical fiber strands with a functional protective layer, optical fiber codes made by covering optical fiber strands with a jacket, bundle fibers made of an assembly of bulk fibers, and optical fiber cables made by applying tension members to the bulk fibers.

These plastic optical fibers, however, have many C—H bonds in the core polymer, and light absorption based on the stretching vibration of the C—H bonds, appears at the regions of the short wavelengths. Five to eight times harmonic absorptions also appear at the near infrared to visible ray region, namely, at a wavelength of not less than 400 nm. These serious light transmission losses in these regions have to be eliminated to use these conventional plastic optical fibers for light transmission. For example, the transmission loss of an optical fiber having a core of PMMA is about 100 dB/Km at a wavelength of 650 nm, and about 400 dB/Km at a wavelength of 780 nm. To avoid the transmission losses based on the C—H bonds in the core polymer, a core polymer comprising $d_8$—PMMA, of which all the H atoms in PMMA are replaced by deuterium atoms, was proposed. This optical fiber containing $d_8$—PMMA as a core polymer has a transmission loss of 50 dB/Km at a wavelength of 780 nm. Deutrated PMMA, however, has high water absorbing properties, and the $d_8$—PMMA core polymer absorbs water, and the transmission loss will increase with the lapse of time. An optical fiber showing such an increase in transmission loss cannot be used as an optical fiber, as an optical fiber is expected to have a high reliability over a long period.

At present light-emitting diodes (LEDs) that can emit rays in the near infrared region, and which have high power, and which can be used for high-speed data transmission, have been produced in large quantities at a low cost. Since conventional plastic optical fibers, however, cannot use these LEDs as a light source for optical communications, light transmission beyond a wave guide length longer than 100 m cannot be accomplished with one optical fiber. Thus, LAN systems (Local-Area Network Systems) using plastic optical fibers have not been so widespread.

Recently, plastic optical fibers that can transmit rays in the near infrared region have been developed. For example, an optical fiber comprising a core polymer of a polymer of α-fluoro acrylic acid fluoroalkyl ester, and a clad copolymer of vinylidene fluoride and tetrafluoroethylene was disclosed in EP 340557 A2 and EP 340555 A2. This optical fiber can transmit rays having a wavelength in the near infrared region, but its performance as an optical fiber is not satisfactory, since the difference in the refractive index between the core polymer and the clad polymer is not large enough to make an optical fiber having a large numerical aperture, and thus this optical fiber is not satisfactory as an optical fiber for transmitting data in a great amount. Further, because of its small numerical aperture, it is difficult for this optical fiber to inhibit the leakage of rays from its side surface when it is bent, and thus it is not satisfactory as an optical fiber for data communication.

Furthermore, the vinylidene fluoridetetrafluoroethylene copolymer is not a perfectly amorphous polymer, and by this reason, has light-absorbing properties or light-scattering properties. Thus, an optical fiber containing this clad copolymer is not satisfactory in light transmission properties.

As a transparent clad material having a low refractive index, a copolymer of perfluoro[2,2-dimethyl-1,3-dioxole] and at least one other ethylenically unsaturated monomer has been reported.

This clad material is proposed to be used in combination with a core material composed of an α, β-unsaturated carboxylic acid ester represented by the following general formula (I) as the main component:

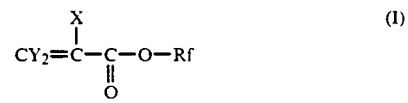

(wherein X is $CH_3$, H, D, F, Cl, or $CF_3$; Y is H or D; and Rf is a fluoroalkyl group having a linear or branched chain).

However, this core material is glassy and hard, and it is unsatisfactory in its strength for use as an optical fiber.

To use this core material as an optical fiber, it is necessary to stretch it to enhance its strength. However, the absolute difference $|Tg_1-Tg_2|$ between the glass transition temperature of a clad material made of the copolymer of perfluoro[2,2-dimethyl-1,3-dioxole] ($Tg_2$ (°C)) and at least one other ethylenically unsaturated monomer results in that of this core material ($Tg_1$(°C)) becomes too large, the stretching temperature of the optical fiber becomes too high for a clad material to be stretched, and the properties of this optical fiber being damaged.

In addition to this problem, a clad copolymer comprising perfluoro[2,2-dimethyl-1,3-dioxole] as the main monomer does not adhere well to a core material. This is a characteristic feature of a fluorine plastic. If an optical fiber having a core-clad two-layer structure containing this polymer as the core material is bent, the clad layer often separates from the core layer, and the plastic optical fiber decreases in flexibility. Such flexibility is a significant advantage of a plastic optical fiber.

SUMMARY OF THE INVENTION

It is a general object of the present invention to provide an all-plastic optical fiber which is excellent in light transmission properties and which is suitable as an optical fiber for long distance light communication.

More specifically, in accordance with the present invention, there is provided a novel all-plastic optical fiber having core and clad components which avoid all of the above-noted problems, wherein the core component is composed of a homopolymer or copolymer of a monomer selected from one or more monomers represented by the general formula (I), or a copolymer of the at least one monomer represented by the general formula (I) and other copolymerizable comonomers and which has a glass transition temperature $Tg_1(°C)$; and wherein the clad component is composed of a copolymer of perfluoro[2,2-dimethyl-1,3-dioxole] and one other ethylenically unsaturated monomer and which has a glass transition temperature $Tg_2(°C)$; and which satisfies the relationship of $|Tg_1 - Tg_2| \leq 30°$ C.

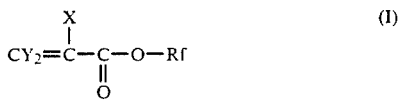

wherein X is $CH_3$, H, D, F, Cl, or $CF_3$; Y is H or D; and Rf is a fluoroalkyl group having a linear or branched chain).

DESCRIPTION OF THE PREFERRED EMBODIMENTS

Figure 1:
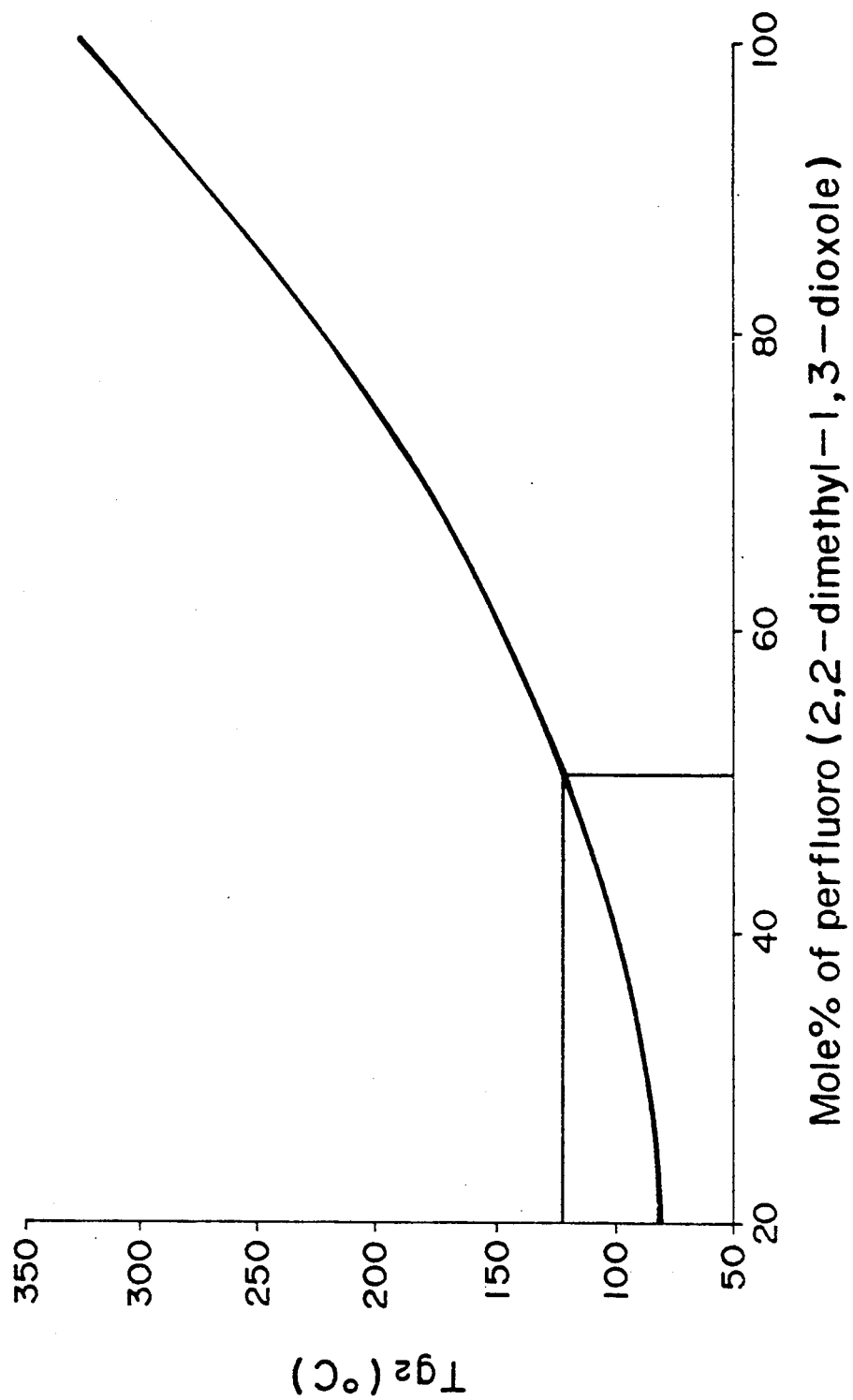
FIG. 1 is a drawing showing the relationship between the mole % ratio in a clad polymer of a copolymer of perfluoro[2,2-dimethyl-1,3-dioxile] and tetrafluoroethylene and its glass transition temperature $Tg_2(°C)$.

The core polymer used in the present invention is a homopolymer or copolymer of a monomer selected from one or more monomers represented by the general formula (I), or a copolymer of the at least one monomer represented by the general formula (I) and other copolymerizable comonomers.

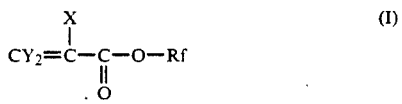

(wherein X, Y, and Rf represent the same as mentioned above).

Examples of the monomer represented by the formula (I) include fluoroalkyl acrylates, α-fluoroacrylates, α-chloroacrylates, or methacrylates containing a fluoroalkyl group or a perfluoroalkyl group as Rf. Examples of the Rf group include a linear fluoroalkyl group represented by $-(CH_2)_m(CF_2)_nZ$ (wherein m is an integer of 0 to 2; n is an integer of 1 to 12; Z is H or F), or $-CH_2C(CF_3)_2A$ (wherein A represents H,D, F an aliphatic alkyl or alicyclic alkyl group, or an aromatic alkyl group), or $-C(C_3F)_2A$ (wherein A represents the same as mentioned above).

As stated above, the core polymer used in the present invention comprises a polymer constituted from a monomer represented by the formula (I) as the main monomer, and it is preferably constituted from a monomer represented by formula (I) in at least 30 mole %, more preferably in at least 75 mole %. If the content of this monomer is less than 30 mole%, the amount of the C—H bonds in the core polymer becomes high, and the water absorption becomes high. Thus, a plastic optical fiber excellent in light transmission cannot be obtained.

Examples of the other monomers copolymerizable with the monomer represented by the formula (I) include methacrylates, or acrylates whose ester is methyl ester, ethyl ester, n-butyl ester, t-butyl ester, cyclohexyl ester, phenyl ester, or isobornyl ester, maleimides, phenylmaleimides, acrylic acid, methacrylic acid, itaconic acid, styrene, α-methylstyrene, p-chlorostyrene, acrylonitrile, and vinyl acetate.

The refractive index n of the core polymer used in the present invention has a relatively low value, and is in the range of 1.33 to 1.46. The refractive index $n_2$ of the clad polymer used in the optical fiber of the present invention shall be in the range of from 1.29 to 1.35, and the difference $(n_1 - n_2)$ shall be not less than 0.01, and preferably not less than 0.03.

The preferable clad copolymer to be used in the present invention is a copolymer of perfluoro[2,2-dimethyl-1,3-dioxole] and at least one other copolymerizable ethylenically unsaturated monomer. The perfluoro[2,2-dimethyl-1,3-dioxole] can be prepared by, for example, the method disclosed in U.S. Pat. No. 3,865,845, and its copolymer with the unsaturated monomer can be prepared by, for example, the method disclosed in U.S. Pat. No. 3,978,030.

Examples of the copolymerizable ethylenically unsaturated monomer include ethylene, propylene, isobutylene, 1-butene, methyl vinyl ether, ethyl vinyl ether, propyl vinyl ether, butyl vinyl ether, $CF_2=CF_2$, $CHF=CF_2$, $CH_2=CF_2$, $CH_2=CHF$, $CClF=CF_2$, $CHCl=CF_2$, $CCl_2CF_2$, $CClF=CClF$, $CHF=CCl_2$, $CH_2=CCl_2=CClF$, fluoropropylene compounds such as $CF_3CF=CF_2$ and $CF_3CF=CHF$, monomers having functional groups such as perfluoro(alkyl vinyl ether), methyl-3-[1-[difluoro[(trifluoroethenyl)oxy]methyl]-1,2,2,2-tetrafluoroethoxy]-2,2,3,3-tetrafluoropropanoate, and 2-{1-[difluoro[(trifluoroethenyl)oxy]methyl]-1,2,2,2-tetrafluoroethoxy}-1,1,2,2-tetrafluoroethanesulfonyl fluoride.

The clad polymer shall be amorphous and highly transparent, and has a refractive index in the range of from 1.29 to 1.35. To prepare a clad copolymer satisfying these requirements, the content of the perfluoro[2,2-dimethyl-1,3-dioxole] unit in the clad polymer is in the range of 20 mole % to 100 mole %, preferably in the range of 25.0 to 99.7 mole %.

The glass transition temperature of the clad copolymer $(Tg_2(°C))$ varies, for example, in a manner as shown in FIG. 1, depending on the content of the perfluoro[2,2-dimethyl-1,3-dioxole] unit in the clad copolymer. A clad copolymer having a desired glass transition temperature can be obtained by controlling the content of the perfluorodioxole in the clad copolymer to have the absolute difference $|Tg_1 - Tg_2|$ be not more than 30° C., depending on the glass transition temperature of the core polymer $(Tg_1(°C))$.

If a polymer having a high glass transition temperature is used as a clad polymer, plasticizers are preferably added to the clad copolymer to lower its glass transition temperature. One example of the plasticizers is a perfluoroalkyl ether having a Mn of not more than 10,000, and it may be added in an amount of 1 to 50 wt %, preferably 5 to 30 wt %, based on 100 wt % of a perfluoro[2,2-dimethyl-1,3-dioxole] polymer having a Mn of not less than 15,000. This specific plasticizer is preferably added to the clad polymer, since it has a small tendency to exude. Examples of the perfluoroalkyl ether include

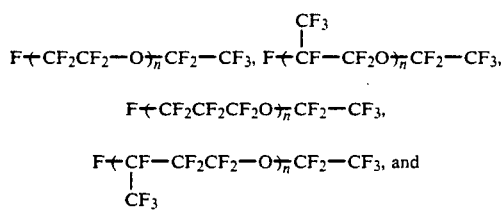

commercially available ones are that produced by Daikin Kogyo Co., Ltd. under the trademark "Demnum," or that produced by DuPont Co., Ltd. under the trademark "Krytox".

The glass transition temperature of the blend of the perfluoro[2,2-dimethyl-1,3-dioxole] copolymer and the plasticizer varies depending on the content of the plasticizer added, and a blend having a desired glass transition temperature can be obtained by controlling the content of the plasticizer.

Figure 2:
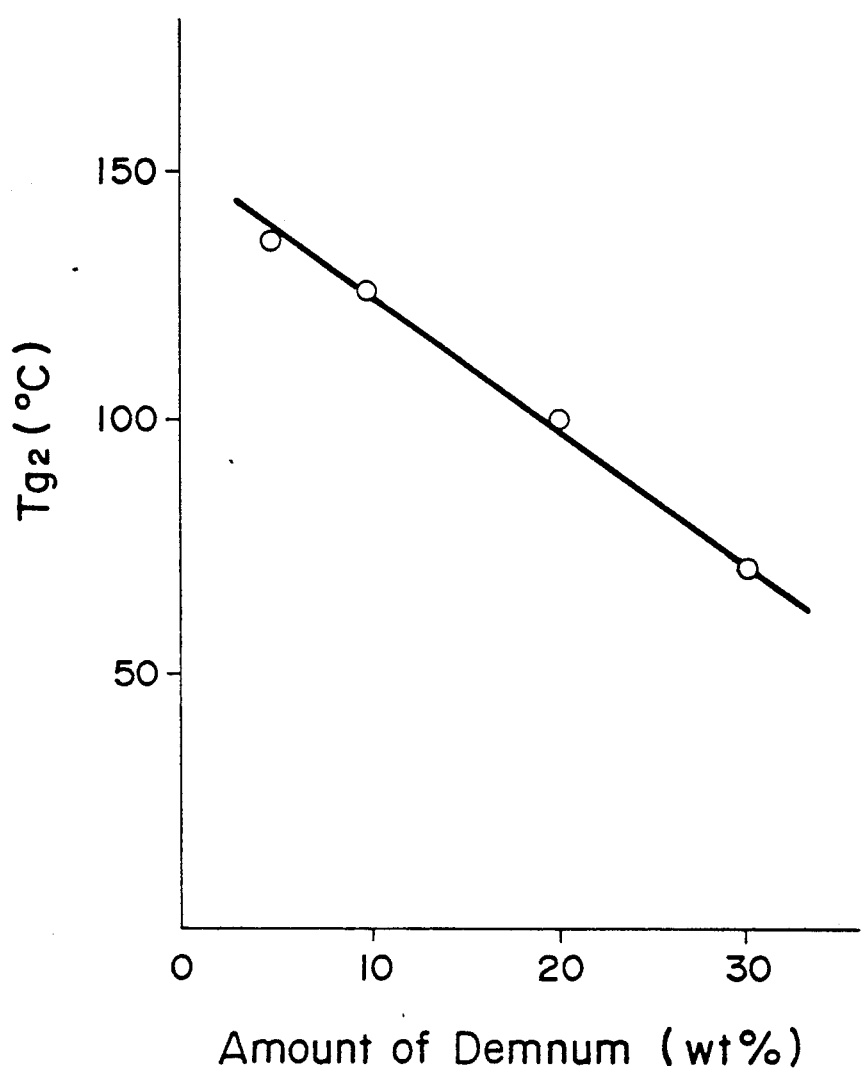
FIG. 2 is a drawing showing $Tg_2(°C)$ of a copolymer of 60 mole % of perfluoro[2,2-dimentyl-1,3-dioxole] and 40 mole % of tetrafluoroethylene when various amounts of a plasticizer (DEMNUM) are added.

FIG. 2 is a figure showing the relation of the glass transition temperature of a blend of a perfluoro[2,2-dimethyl-1,3-dioxole]/tetrafluoroethylene copolymer (60/40 mole %) and a perfluoroether (plasticizer) to the adding ratio of the plasticizer.

In making the plastic optical fiber of the present invention, the core-clad type conjugate spinning method, the ram extrusion method, the melt coating method for a clad material, and the solvent coating method using a clad material solution, can all be used. In manufacturing optical fibers, dust-free conditions are necessary.

Among these methods, the core-clad type conjugate melt spinning method is the most preferable one. In conducting this method, the melt flow rate of the core polymer [$MFR_1$] and that of the clad polymer [$MFR_2$] must satisfy the relationship of ($MFR_1 \leq MFR_2$). If an optical fiber is spun from a core polymer and a clad polymer that do not satisfy this relationship, a regular core-clad structure cannot be obtained, and the light transmission properties of the thus-produced fiber are not excellent.

The MFR values of a polymer were measured by a method based on the method A stated in JIS K-7210, formulated in 1976. Namely, 5 g of a polymer is filled in a die having a die length of 8 mm and an inner diameter of 2.0 mm and put a load of 5 kg at 230° C., and the amount of the polymer extruded from the tip of the die for ten minutes is measured. These values were employed as MFR values.

The plastic optical fiber thus-obtained is excellent in light transmission properties, and can transmit light in the visible-to-near infrared region, since the content of the C—H bonds is small and the water absorption is small. The plastic optical fiber of the present invention enables long distance communication exceeding 1 km, and it can be used as an optical fiber in light communication fields such as for LAN and FA. In addition to this feature, the optical fiber of the present invention can provide an optical fiber having a large numerical aperture, since this optical fiber is comprised of a core polymer having a refractive index ($n_1$) of 1.33 to 1.46, and a clad polymer having a refractive index ($n_2$) of 1.29 to 1.35 and the difference ($n_1-n_2$) being not less than 0.01.

The strength and flexibility of the plastic optical fiber are satisfactory, but they can be further improved by stretching the optical fiber made by the conjugate spinning method from 1.2 to 10 times to length preferably from 1.5 to 5 times, without damaging the light transmission properties. The stretching temperature shall be 5 to 50° C. higher, preferably 10° to 30° C. higher, than the glass transition temperature of the core polymer.

The plastic optical fiber of the present invention preferably has a concentric three-layer structure wherein a protective layer is further provided on the clad layer, since the protective layer ensures the adherence of the clad layer to the core fiber and thereby further increases the flexibility of the optical fiber. A polymer for the protective layer preferably has a breaking extension of not less than 10%.

Preferable examples of the polymers for the protective layer include an ABS (elongation at rupture 40%), a SBR (100%), an ethylene-vinyl alcohol copolymer (200%), an ethylene-vinyl chloride copolymer (170%), an ethylene-vinyl acetate copolymer (800%), an ionomer (370%). a polymethylpentene (10%). a polyethylene (600%), a polypropylene (60%), an ethylene-α-olefin copolymer (500%), a polycarbonate (100%), a polyamide (100%), a polyoxymethylene (60%), a polyethylene terephtalate (350%), a polybutylene terephtalate (350%), a polyurethane (500%), a high-impact polystyrene (60%), a polyvinylidene chloride (150%), a polyacrylate (50%), a polyethersulfone (60%), a polyphenylene oxide (60%), a polysulfone (60%), various thermo-plastic elastomers (500~700%), a polyfluorovinylidene or its copolymer (200~400%), a long-chain fluoroalkyl methacrylate polymer (20%), a fluroalkyl acrylate polymer (300%), an α-fluoroalkyl acrylate polymer (20%), a polychlorotrifluoroethane or its copolymer (100~200%), an alkyl acrylate copolymer (700%), and a long-chain alkyl methacrylate (50%).

The thickness of the protective layer is preferably within the range of 1 to 100 μm. If the thickness is less than 1 μm, the flexibility of the optical fiber is not sufficient, and the clad layer often separates from the core layer when the optical fiber is bent. If the thickness exceeds 100 μm, the amount of light that can enter an optical fiber will be limited, since the surface area of the core fiber becomes small in relation to the total surface area of the optical fiber.

To prevent the light propagation in the clad layer (cladding modes), the difference between the refractive index $n_2$ of the clad polymer and the $n_2$ of the protective layer should preferably be not less than 0.05.

In making a plastic optical fiber having a concentric core-clad-protective layer structure, various methods can be used such as 1) the method of forming the concentric core layer-clad layer-the protective layer-structure by the concentric three-layer conjugate melt spinning method; 2) the solvent coating method or light-curing or heat-curing method of the protective layer after the formation of the concentric core-clad structure by the two-layer conjugate melt spinning method; 3)

successive applications of the clad layer and protective layer by solvent coating or the coating of a light-curing or heat-curing resin after the formation of the core fiber by melt spinning; and 4) the melt coating method of the protective layer after the formation of the concentric core-clad structure by the conjugate melt spinning method. Among these methods, the first method is most preferable in view of its productivity, the uniformity in the fluctuation of the diameter of the optical fiber made, and that in the fluctuation of light transmission loss.

The plastic optical fiber thus made should preferably be stretched from 1.2 to 10 times, preferably from 1.5 to 5 times its original length, to improve its flex resistance. The thus-stretched optical fiber is very good in handling, since no separation of the core layer and clad layer, nor breaking or damaging of the core layer, are observed even after repeated flexing because of the existence of the protective layer.

The present invention will now be described in more detail, with reference to the following examples and comparative examples.

EXAMPLE 1

All monomers to be used were purified by a conventional method, and they were used immediately after distillation. A monomer mixture was obtained by adding 18 ppm of di-tertiarybutyl peroxide and 0.3 wt % of n-octylmercaptane to α-fluoro 1,1,1,3,3,3-hexafluoroisopropyl acrylate. This mixture was filtrated with a tetrafluoroethylene membrane filter of 0.02 μm pore size, and then polymerized for 3 hours at 150° C. under a pressure of $N_2$, and a syrup having a polymerization conversion ratio of 54% was obtained. This syrup was continuously fed into a vented extruder to get a polymer containing a residual monomer of not more than 0.5%. This polymer was fed into the core polymer feeding portion in a spinning machine maintained at 180° C. The core polymer had a Tg of 103° C. measured by differential scanning calorimetry (DSC) and a refractive index of 1.356. A clad copolymer of 50 mole % of perfluoro[2,2-dimethyl-1,3-dioxole] and 50 mole % of tetrafluoroethylene (Tg: 120° C., refractive index: 1.308) was melted with a melt extruder, and was fed into the clad material feeding portion in the spinning machine.

The fed core and clad polymers were spun through a conjugate spinning nozzle to give an optical fiber having a core-clad structure and an outer diameter of 1.41 mmφ. The thus-prepared optical fiber was stretched to twice its length at 135° C., and an optical fiber having an outer diameter of 1 mmφ was obtained. The light transmission loss of the optical fiber was very small (87 dB/km at a wavelength of 650 nm; 112 dB/km at a wavelength of 770 nm; 223 dB/km at a wavelength of 950 nm).

The repeating bending test was conducted for this optical fiber in accordance with JIS C 6821-1989 (weight 500 g). The optical fiber was subjected to a repeating bending test having a bending cycle (90 in both the right and left directions with respect to the vertical direction) with a curvature having a bending radius R of 10 mm. The optical fiber was not broken until 12,000 bending cycles.

COMPARATIVE EXAMPLE 1

An optical fiber having an outer diameter of 1 mmφ was obtained by the same method as that used in Example 1, except that the core forming polymer used was a PMMA.

The light transmission losses were 129 dB/km at 650 nm, 543 dB/km at 770 nm, and 2,900 dB/km at 950 nm.

EXAMPLE 2

An optical fiber was used that had an outer diameter of 1 mmφ. The same polymer as used in Example 1 was used, and the conjugate melt spinning method was used. The same repeated flex test used in Example 1 was conducted on this optical fiber, without it being stretched. The transmission losses were 93 dB/km at a wavelength of 650 nm, 122 dB/km at 770 nm, and 217 dB/km at 950 nm. The optical fiber was broken after 1,000 bending cycles.

EXAMPLES 3, 4 and 5

Optical fibers were obtained by using the same core polymers and clad polymers as in Table 1, and by using the same method as in Example 1. The light transmission losses measured and the results of the repeating bending tests are shown in Table 1.

EXAMPLE 6

An optical fiber having an outer diameter of 1.41 mmφ was obtained by the conjugate spinning method by using the same core material as used in Example 1 and the clad-forming polymer composition (refractive index 1.307; Tg 100° C.) comprising 80 wt % of a copolymer of perfluoro[2,2-dimethyl-1,3-dioxole]/tetrafluoroethylene (60/40 mole %) having a Tg of 145° C. and 20 wt % of $FCF_2\text{-}CF_2\text{--}CF_2\text{--}O)_nCF_2\text{--}CF_3$ Mn 8,000; plasticizer Demnum S-200). The optical fiber was stretched to twice its original length at 135° C. The transmission loss was 85 dB/km at 650 nm. The repeated flex test was conducted by using the same method as that used in Example 1, and the optical fiber was not broken until 11,000 bending cycles.

EXAMPLES 7

All monomers to be used were purified by a conventional method, and they were used immediately after distillation.

To 100 parts by weight of a monomer mixture of 70 mole % of trifluoroethyl methacrylate and 30 mole % of methyl methacrylate, 0.15 wt % of n-octylmercaptan and 30 ppm of di-tertiarybutyl peroxide were added. The thus-prepared mixture was filtrated with a tetrafluoroethylene membrane filter of 0.02 μm pore size, and then polymerized for 5 hours at 150° C. under a pressure of $N_2$, and a syrup having a polymerization conversion ratio degree of 47% was obtained. This syrup was continuously was fed into a vented extruder to get a polymer containing a residual monomer of not more than 0.5%. This polymer was fed into the core polymer feeding portion in a spinning machine maintained at 210° C. The core polymer had a Tg of 96° C. measured by DSC and a refractive index of 1.424.

A clad copolymer having a Tg of 120° C. of 50 mole % of perfluoro[2,2-dimethyl-1,3-dioxole] and 50 mole % of tetrafluoroethylene was melted with a melt extruder, and was fed into the clad material feeding portion in the spinning machine.

The fed core and clad polymers were spun through a conjugate spinning nozzle to give an optical fiber having a core-clad structure and an outer diameter of 1.41 mmφ. This optical fiber was stretched to twice its original length, and an optical fiber having an outer diameter of 1.00 mmφ was obtained. The light transmission losses of the thus-produced optical fiber were 95 dB/km at a wavelength of 650 nm, 378 dB/km at a wavelength of 770 nm, and 820 dB/km at a wavelength of 950 nm. The same bending test as that used in Example 1 was conducted, and this optical fiber was not broken until 8,000 bending cycles.

EXAMPLE 8

A core-forming polymer having a Tg of 96° C. measured by DSC and a refractive index of 1.424 was obtained by the same method as that used in Example 7. A clad-forming copolymer of 50 mole % of perfluoro[2,2-dimethyl-1,3-dioxole] and 50 mole % of tetrafluoroethylene was melted with a melt extruder, and was fed into the clad material feeding portion in the spinning machine. The clad-forming polymer obtained had a glass transition temperature of 120° C. and a refractive index of 1.308.

A copolymer of 80 mole % of vinylidene fluoride and 20 mole % of tetrafluoroethylene was melted with a melt extruder, and was fed into the protective-layer feeding portion in the spinning machine. The polymer obtained had a refractive index of 1.403. The three polymers thus fed into the spinning machine were spun through a three-layer conjugate spinning nozzle to give an optical fiber having a core-clad-protective layer structure and an outer diameter of 1.41 mmφ. The optical fiber was stretched to twice its length at 135° C., and a stretched optical fiber having an outer diameter of 1 mmφ, a core diameter of 980 μm, a clad thickness of 5 μm, and a protective layer thickness of 5 μm, was obtained. The transmission loss of the stretched optical fiber was very small (96 dB/km at 650 nm; 417 dB/km at 770 nm; 1014 dB/km at 950 nm). The stretched optical fiber was subjected to a bending having the same bending cycle as that used in Example 1 with a curvature having a bending radius R of 5 mm. The optical fiber was not broken until 8,000 bending cycles. No separation of the clad was observed.

EXAMPLE 9

The same core and clad polymers as those used in Example 8 were spun through a concentric two-layer conjugate spinning nozzle to give an optical fiber having a core-clad structure, a core diameter of 990 μm, and a clad thickness of 5 μm. The transmission loss of the optical fiber thus obtained was very small (101 dB/km at 650 nm; 431 dB/km at 770 nm; 923 dB/km at 950 nm). This optical fiber was subjected to the same repeating bending test as that conducted in Example 8. A separation of the cladding was observed around the bending center after 10 bending cycles.

EXAMPLES 10

The same polymers for forming core, clad and protective layers as those used in Example 8 were spun through a three-layer conjugate spinning nozzle to give an optical fiber having an outer diameter of 1 mmφ. The transmission losses were 92 dB/km at 650 nm, 420 dB/km at 770 nm, and 942 dB/km at 950 nm.

This optical fiber was subjected to the same repeating bending test as conducted in Example 8. No separation of the clad was observed, but the optical fiber was broken after 500 bending cycles.

EXAMPLE 11

The same core forming polymer and clad forming copolymer as those prepared in Example 8 were fed into the core material feeding portion and the clad material feeding portion in the spinning machine, respectively.

A bisphenol A type polycarbonate (viscometric average Mw 19,000) was melted with a melt extruder, and then was fed into the protective layer material feeding portion.

These three polymers were spun through a concentric three-layer conjugate spinning nozzle to give an optical fiber having a core-clad-protective layer structure and an outer diameter of 1.41 mmφ. This optical fiber was stretched three times its original length at 150° C., and an optical fiber having a core diameter of 970 μm, a cladding thickness of 5μm, a protective layer thickness of 10 μm, and an outer diameter of 1 mmφ. The transmission loss of this optical fiber was very small (81 dB/km at 650 nm; 98 dB/km at 770 nm: 201 dB/km at 950 nm). This optical fiber was subjected to the same repeating bending test. No deterioration of the surface, such as separation of the cladding from the core was observed. The same bending test as that used in Example 8 was conducted, and the optical fiber was not broken until 9,000 bending cycles.

EXAMPLES 12 and 13

The core, cladding, and protective layer forming polymers listed in Table 2 were used, and optical fibers having a core diameter of 960 μm, a cladding thickness of 10 μm, a protective layer thickness of 10 μm, and an outer diameter of 1,000 μm, were obtained by employing the same method as that of Example 8. The light transmission loss and flexibility measured were also shown in Table 2.

EXAMPLE 14

An α-fluoro-1,1,1,3,3,3-hexafluoroisopropyl acrylate polymer as a core-forming polymer, a polymer composition having a Tg of 118° C. and a refractive index of 1.304 as a clad forming polymer of a blend of 90 wt % of a copolymer of perfluoro[2,2-dimethyl-1,3-dioxole]/tetrafluoroethylene (60/40 mole %) and 10 wt % of

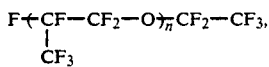

(a perfluoroalkylether) having a Mn of 8,250 (Krytox 143 AD manufactured by DuPont), and a copolymer of vinylidene fluoride/tetrafluoroethylene (80/20 mole %) as a protective-layer forming polymer, were spun through the concentric core-clad-protective layer three-layer conjugate spinning nozzle, and the optical fiber thus spun was stretched to twice its original length at 135° C. to give an optical fiber having a core diameter of 960 μm, a cladding thickness of 10μm, and an outer diameter of 1,000 μm. The transmission loss at 650 nm was 76 dB/km. The same repeating bending test (R: 5 mm) was conducted, and no deterioration of the surface, such as the separation of the cladding was observed. The optical fiber was not broken until 11,000 bending cycles, and exhibited good mechanical properties.

EXAMPLE 15

The same core-forming polymer and clad-forming polymer used in Example 14 were spun through a concentric core-clad two-layer conjugate spinning nozzle to give an optical fiber having a core diameter of 980 μm, a cladding thickness of 10 μm, and an outer diameter of 1,000 μm. The transmission loss of this optical fiber was low (65 dB/km at 650 nm). The same bending test as used in Example 8 was conducted, and a separation of the cladding was observed around the bending center after 20 bending cycles.

EXAMPLE 16

The core forming polymer and clad forming polymer listed in Table 2 were spun through a concentric conjugate melt spinning nozzle, and the fiber thus spun was stretched to twice its original length at 135° C. to give an optical fiber having an outer diameter of 990 μm. This optical fiber was coated with vinylidene fluoride (acetone solution 20 wt %) by using a coating die, and then the fiber was dried. The thus-prepared fiber had an outer diameter of 1 mmφ. The physical properties of this optical fiber are shown in Table 2.

What is claimed is:

1. A plastic optical fiber comprising:

a) a core polymer having a glass transition temperature $Tg_1$ °C, and comprising either a homopolymer or copolymer of a monomer selected from one or more monomers represented by the general formula (I), or a copolymer of the at least one monomer represented by the general formula (I) and other copolymerizable comonomers:

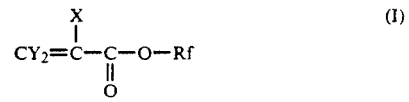

(wherein X is $CH_3$, H, D, F, Cl, or $CF_3$; Y is H or D; Rf is a fluoroalkyl group having a linear or branched chain);

b) a clad polymer having a glass transition temperature $Tg_2$ °C, and comprising a copolymer of perfluoro[2,2-dimethyl-1,3-dioxole] and one other ethylenically unsaturated monomer;

and that meets the condition wherein the absolute difference $|Tg_1-Tg_2|$ is not greater than 30° C.

2. The plastic optical fiber as claimed in claim 1, wherein the clad polymer is formed of a blend of 50 to 99% by weight of a copolymer of perfluoro[2,2-dimeth-

TABLE 1

| Ex. No. | Monomer Concentration in the Core Forming Polymer [$Tg_1$° C.] (Refractive Index) | Monomer Concentration in the Clad Forming Polymer [$Tg_2$° C.] (Refractive Index) | Light Transmission Loss (dB/Km) 650 nm | 770 nm | 950 nm | Repeating Bending Test (Bending Radius 10 mm) (Number of bending cycles reached when the fiber was broken) |
|---|---|---|---|---|---|---|
| 2 | α-fluoro-2,2,2-trifluoroethyl acrylate 80 mole % α-fluoromethyl acrylate 20 mole % [104° C.] (1.403) | perfluoro[2,2-dimethyl-1,3-dioxole] 50 mole % tetrafluoroethylene 50 mole % [120° C.] (1.308) | 103 | 140 | 307 | 10000 |
| 3 | α-fluoro-2,2,2-trifluoroethyl acrylate 70 mole % α-fluoro-2,2,3,3,3-pentafluoropropyl acrylate 30 mole % [105° C.] (1.385) | same as above | 105 | 146 | 298 | 12000 |
| 4 | α-fluoro-1,1,1,3,3,3-hexafluoroisopropyl acrylate 70 mole % α-fluoro-2,2,2-trifluoroethyl methacrylate 30 mole % [103° C.] (1.375) | same as above | 94 | 131 | 232 | 9000 |

TABLE 2

| Ex. No. | Monomer Concentration the Core Forming Polymer [$Tg_1$° C.] (Refractive Index) | Monomer Concentration in the Clad Forming Polymer [$Tg_2$° C.] (Refractive Index) | Protective Layer Forming Polymer (Refractive Index) | Light Transmission Loss (dB/Km) 650 nm | 770 nm | 950 nm | Repeating Bending Test (Bending Radius 5 mm) (Number of bending cycles reached when the fiber was broken) |
|---|---|---|---|---|---|---|---|
| 12 | α-fluoro-2,2,2-trifluoroethyl acrylate 80 mole % α-fluoromethyl acrylate 20 mole % [104° C.] (1.403) | perfluoro[2,2-dimethyl-1,3-dioxole] 50 mole % tetrafluoroethylene 50 mole % [110° C.] (1.308) | polymethyl methacrylate (1.531) | 73 | 203 | 430 | 8000 |
| 13 | α-fluoro-2,2,2-trifouoroethyl acrylate 70 mole % α-fluoro-2,2,3,3,3-pentafluoropropyl acrylate 30 mole % [105° C.] (1.385) | perfluoro[2,2-dimethyl-1,3-dioxole] 50 mole % chlorotrifluoroethylene 50 mole % [114° C.] (1.330) | polyethylene (1.518) | 68 | 129 | 230 | 7000 |
| 16 | α-fluoro-1,1,1,3,3,3-hexafluoroisopropyl acrylate 70 mole % α-fluoro-2,2,2-trifluoroethyl methacrylate 30 mole % [103° C.] (1.375) | [copolymer of perfluoro (2,2-dimethyl-1,3-dioxole) 60 mole % and tetrafluoroethylene 40 mole %] 90 wt % Krytox 143 AD 10 wt % [118° C.] (1.304) | polyfluor- idevinylidene (1.420) | 74 | 121 | 210 | 7000 | yl-1,3-dioxole] and 1 to 50 % by weight of a perfluoroalkylether.

3. The plastic optical fiber as claimed in claim 1 or 2, wherein the optical fiber is that obtained by stretching, from 1.2 to 10 times its length, the fiber obtained by a concentric conjugate spinning of the core polymer and the clad polymer.

4. The plastic optical fiber as claimed in claim 1 or 2, wherein the optical fiber is that obtained by stretching from 1.2 to 10 times its length, the fiber obtained by a concentric conjugate spinning of the core polymer, clad polymer, and a protective layer polymer.

5. The plastic optical fiber as claimed in claim 1 or 2, wherein the optical fiber has a three-layer structure wherein the optical fiber further has a protective layer on the cladding.

6. The plastic optical fiber as claimed in claim 4, wherein the protective layer has a thickness of from 1 to 100 μm.

7. The plastic optical fiber as claimed in claim 5, wherein the protective layer has a thickness of from 1 to 100 μm.

* * * * *